A. B. BEITMAN.
COMBINED TIRE CARRIER AND LUGGAGE RECEPTACLE.
APPLICATION FILED APR. 23, 1915.
1,253,339. Patented Jan. 15, 1918.
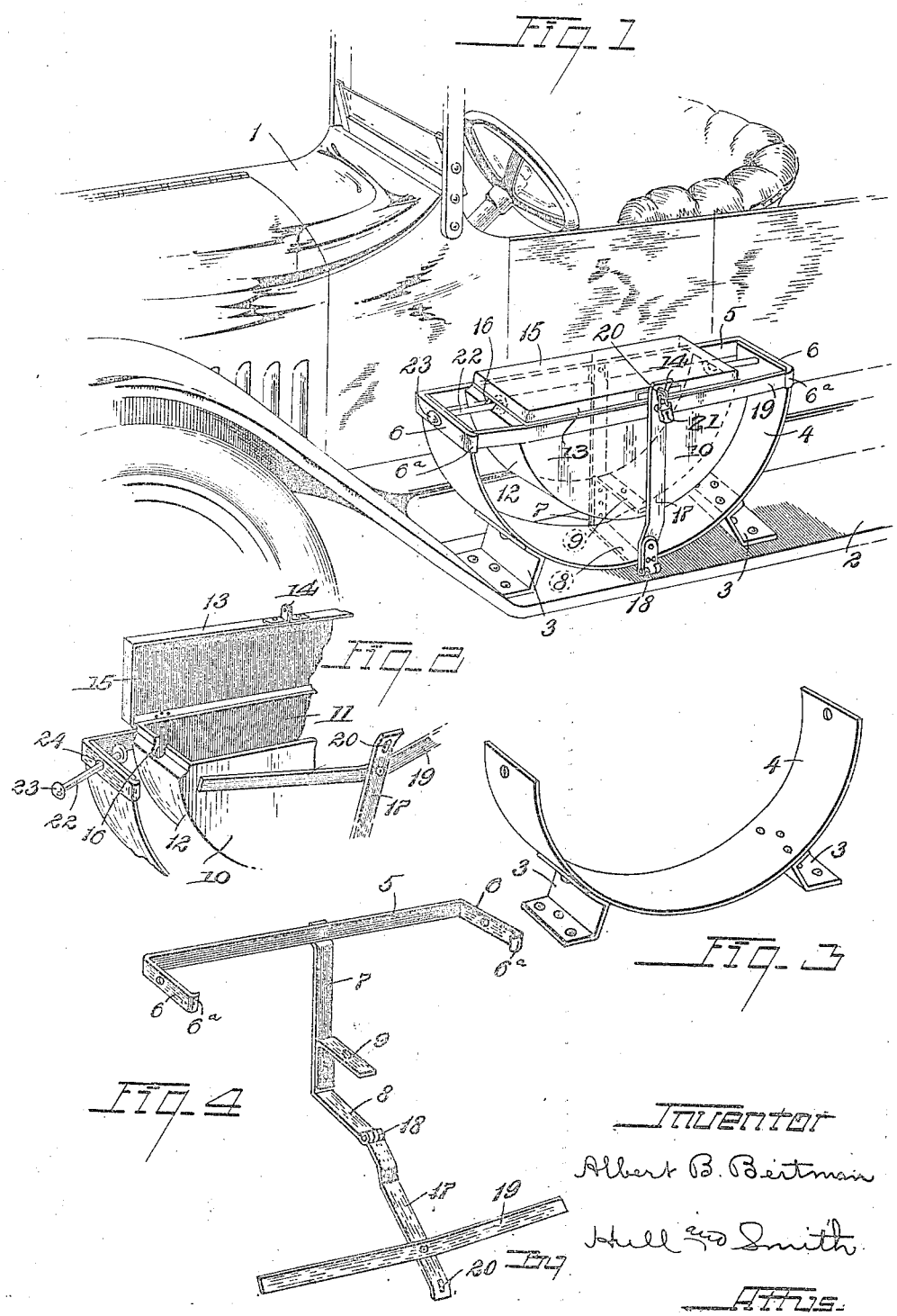

UNITED STATES PATENT OFFICE.

ALBERT B. BEITMAN, OF EAST CLEVELAND, OHIO.

COMBINED TIRE-CARRIER AND LUGGAGE-RECEPTACLE.

1,253,339.　　　　Specification of Letters Patent.　　Patented Jan. 15, 1918.

Application filed April 23, 1915.　Serial No. 23,495.

*To all whom it may concern:*

Be it known that I, ALBERT B. BEITMAN, a citizen of the United States, residing at East Cleveland, in the county of Cuyahoga and State of Ohio, have invented a certain new and useful Improvement in Combined Tire-Carriers and Luggage-Receptacles, of which the following is a full, clear, and exact description, reference being had to the accompanying drawings.

This invention relates to an improved tire carrier for automobiles and particularly to one having incorporated within it a tool or luggage receptacle.

The invention has for its objects to provide a device of the aforesaid character that can be conveniently attached to a part of an automobile, and is compact, so that when mounted on the running board, for instance, it occupies but little space; to provide a device of this nature that is very substantial, yet comparatively simple of construction and economical of production; to provide a combined tire carrier and luggage receptacle both of which may be conveniently locked or unlocked by one operation and which, when locked, effectually protects the contents against theft; and to provide a device of the foregoing character that will not rattle when jarred by the vibration of the automobile.

The above objects, and others that will become apparent as this description proceeds, are attained in a device constructed in accordance with the accompanying drawing, and while I will proceed to describe the same in detail, I wish to be understood as not limiting myself to the structural details thereof further than is required by the terms of the annexed claims and is rendered necessary by the state of the prior art.

In the drawing, Figure 1 is a fragmentary perspective view of an automobile having the combined tire carrier and luggage receptacle of my invention applied to the running board thereof; Fig. 2 is a similar view of a portion of the combined tire carrier and receptacle, showing the receptacle open; Fig. 3 is a perspective view of the tire supporting member; and Fig. 4 shows, in perspective, the element whereby the tool or luggage receptacle is supported and spaced from the tire supporting member.

Taking up a detailed description of the invention by the use of reference characters, 1 represents an automobile to the running board 2 whereof is attached feet or brackets 3 for sustaining the tire supporting member 4 of my tire and luggage carrier.

For convenience of description, that side of the device located adjacent the body of the automobile will be referred to as the rear. It will be observed that the tire supporting member 4 is substantially semi-circular in shape, and its ends are rigidly connected by a brace 5, the end portions 6 whereof are turned forward into parallel planes, and are secured in any suitable manner, by riveting or spot welding for instance, to the aforesaid ends of the tire supporting member. Secured to the brace 5, at about its middle, is the upper end of a metal strap 7, the lower end portion 8 of which is turned forward beneath the supporting member 4 and is connected thereto by any convenient method. An L shaped bracket 9 has its vertical branch attached to the lower portion of the strap 7, and its horizontal branch extends out over and is spaced a distance above the central portion of the tire supporting member sufficient to accommodate between it and said member the cross section of an automobile tire, with a spare rim, also, if desired.

The tool or luggage receptacle is made up of a front and a rear semi-circular wall 10 and 11, respectively, and a semi-cylindrical wall 12 connects the curved edges of the walls 10 and 11. The opposite ends of the wall 12 are turned inward and then upward substantially vertical to receive down over them, with the upper edges of the front and rear walls, the peripherial depending flange 13 of the rectangular lid 15. The lid is hinged to the rear wall of the receptacle, and a staple 14 extends from the middle of the forward portion of the flange 13. The upper edges of the wall 12 are notched at 16 for a purpose which will be explained hereafter. When the parts are assembled, the bottom of the receptacle rests upon and is attached to the bracket 9, and the upper edge of the rear wall 11 is fastened to the brace 5. It will be observed that the receptacle is mounted substantially concentric with respect to the tire supporting member so that a tire receiving space surrounds the receptacle. This space is adapted to be closed by a gate comprising a strap 17, that has its lower end hinged at 18, to the forward end of the portion 8 of the strap 7.

A transverse member 19 completes the gate and it has connection at its center with the strap 18, a slight distance below the upper end thereof. The extreme upper end of the strap 17 is provided with a slot 20 for the reception of the above mentioned staple 14 that projects from the forward side of the lid.

It will be observed that the forward ends of the parallel portions 6 of the brace 5 are turned inward at substantially right angles, as shown at 6ª, and that the transverse member 19 of the gate is sprung inward between its ends and its point of connection with the strap 17. The fact that the member 19 is made of resilient material causes said member to be placed under tension when the gate is pressed tightly against the front of the receptacle, and when in this position, the staple 14 projects through the slot 20 to receive a padlock 21. The pressing of the gate against the receptacle results in a straightening out of the member 19 and a projection of its ends laterally behind the inturned portions 6ª. The normal shape of the member 19 permits its ends to pass said inturned portions as the gate is being closed, and the coöperation of said inturned portions with the ends of said member prevents the member from vibrating and rattling against the adjacent side of the receptacle. While I have elected this particular method of preventing the gate from rattling against the receptacle, other means may obviously be employed for this purpose without departing from the spirit of my invention. The present embodiment further prevents the ends of member 19 from being bent forward.

The carrier herein shown is made to accommodate two automobile tires. However, there are times when only one spare tire is carried, and to prevent a single tire from rattling around within the carrier I provide means for dividing the tire space transversely into two zones or sections. These means consist of pins 22 that have heads 23 at both ends, and which are slidable through apertures 24 in adjacent portions of the brace 5 and tire supporting member 4. When in effective position, the inner ends of the pins 22 repose within the previously mentioned notches 16, with their inner heads inside the receptacle. Now, when the lid is closed, the pins are effectually retained against displacement, and if a single tire occupies either of the sections that are separated by said pins, it is held against shifting. From the foregoing it will be seen that the tires are projected against removal and the receptacle retained closed, by a single lock; and the ease and simplicity with which the device may be handled, will be readily appreciated.

While I have illustrated my device as supported upon the running board of an automobile, it will be understood that the same may be attached to any desired part of a vehicle, as by the use of suitable brackets, to the rear thereof.

Having thus described my invention, what I claim is:

1. A device of the character set forth comprising a receptacle that is arranged to repose within the space inclosed by a tire, a lid for said receptacle, a member spaced from the periphery of the receptacle to form with it a tire receiving compartment, a gate hinged to the member and arranged to be swung across the tire receiving compartment, and means for locking the gate and the lid of the receptacle together whereby the lid is held closed and the gate retained in effective position.

2. A device of the character set forth comprising a member arranged to embrace a portion of the periphery of a tire and having abutment portions extending inward from one side thereof, braces extending inward from the opposite side of the member, a receptacle supported by said braces in a position to repose within the space inclosed by the tire, and a gate hinged to that side of the aforesaid member having the abutment portions, the gate having resilient extensions that engage said abutment portions when the gate is closed to secure the gate against vibration.

3. A device of the character set forth comprising a member arranged to embrace a portion of the periphery of a tire and having abutment portions extending inward from one side thereof, braces extending inward from the opposite side of the member, a receptacle supported by said braces in a position to repose within the space inclosed by the tire, a gate comprising a longitudinal member that is hinged to the tire embracing member and having a resilient transverse member that is normally contracted but when pressed against the side of the receptacle becomes expanded for coöperation with the aforesaid abutment portions, said portions being opposed to the aforesaid side of the receptacle, and means for locking the gate against the side of the receptacle.

4. A device of the character set forth comprising a member of a shape to conform to the circumferential curvature of a tire; a substantially horizontal brace connecting diametrically opposite portions of said member, a strap depending from the middle portion of the brace and extending forward beneath the aforesaid member, a receptacle supported by said brace and arranged to repose within the space within the tire, a gate comprising a strap having its lower end hingedly connected to the forward end of the first mentioned strap, and a transverse member connected to the strap of the gate with its ends arranged to extend beyond the sides of the receptacle, and means for retaining the gate in effective position.

5. A device of the character set forth comprising a member of a shape to confrom to the circumferential curvature of a tire, a substantially horizontal brace connecting diametrically opposite portions of said member, a strap depending from the middle portion of the brace and extending forward beneath the aforesaid member, a receptacle supported by said brace and arranged to repose within the space within the tire, said receptacle having an opening, a gate comprising a strap having its lower end hingedly connected to the forward end of the first mentioned strap, and a transverse member connected to the strap of the gate with its ends arranged to extend beyond the sides of the receptacle, a closure for the opening of the receptacle, and means for locking together said closure and the aforesaid gate.

6. A device of the character set forth comprising a member of a shape to confrom to the circumferential curvature of a tire, a substantially horizontal brace connecting diametrically opposite portions of said member, said brace having end portions that extend across said member and are turned inward to constitute abutments, a strap depending from the middle of the brace and extending forward beneath the aforesaid member, a receptacle supported by said brace and arranged to repose within the space inclosed by the tire, a gate comprising a strap having one end hingedly connected to the forward end of the first mentioned strap, and a resilient transverse member attached to the opposite end of the strap of the gate, said transverse member being normally bent so that its ends will pass the above mentioned abutments when the gate is being closed but will be projected into coöperation with said abutments when the transverse member is pressed against portions of the receptacle and the gate is closed, and means for retaining the gate closed.

7. A device of the character set forth comprising a member of a shape to conform to the circumferential curvature of a tire, a substantially horizontal brace connecting diametrically opposite portions of said member, said brace having end portions that extend across said member and are turned inward to constitute abutments, a strap depending from the middle of the brace and extending forward beneath the aforesaid member, a receptacle supported by said brace and arranged to repose within the space inclosed by the tire, said receptacle having an opening, a gate comprising a strap having one end hingedly connected to the forward end of the first mentioned strap, and a resilient transverse member attached to the opposite end of the strap of the gate, said transverse member being normally bent so that its ends will pass the above mentioned abutments when the gate is being closed but will be projected into coöperation with said abutments when the transverse member is pressed against portions of the receptacle and the gate is closed, a closure for the opening, and common means for locking the closure and said gate closed.

8. A device of the character set forth comprising an open top receptacle that is arranged to repose within the space inclosed by a tire, a lid for said receptacle, a member spaced from the periphery of the receptacle to form with it a tire receiving compartment, means for dividing the tire receiving compartment into zones or sections, said means being held in effective position by the lid of the receptacle when said lid is closed, a gate that is adapted to extend across one side of the tire receiving compartment, and means for locking the gate and lid closed.

9. A device of the character set forth comprising a receptacle that is arranged to repose within the space inclosed by a tire, said receptacle having an opening, a closure for said opening, a member spaced from the periphery of the receptacle to form with it a tire receiving compartment, means for dividing the tire receiving compartment into zones or sections, said means having an enlargement that is adapted to enter the opening of, and repose within the receptacle when said means is in effective position, a gate hinged to the member and arranged to swing across the tire receiving compartment, and common means for locking the gate and the aforesaid closure in closed positions.

10. A device of the character set forth comprising a receptacle that is arranged to repose within the space inclosed by a tire, said receptacle having an opening, a closure for said opening hinged to the receptacle, a member spaced from the periphery of the receptacle to form with it a tire receiving compartment, means for dividing the tire receiving compartment into zones or sections, said means having an enlargement that is adapted to enter the opening of, and repose within the receptacle when said means is in effective position, a gate hinged to the member and arranged to swing across the tire receiving compartment, and means for locking the free ends of the gate and closure together.

11. A device of the character set forth comprising a receptacle that is arranged to repose within the space inclosed by a tire, a closure for said receptacle, a member spaced from the periphery of the receptacle to form with it a tire receiving compartment, a closure for said compartment, and common means for retaining the two closures in closing position.

12. A device of the character set forth comprising a receptacle that is arranged to repose within the space inclosed by a tire, a closure for said receptacle, a member spaced from the periphery of the receptacle to form with it a tire receiving compartment, and a closure for said compartment the respective closures having a portion which interengages with that of the other when the closures are in effective position.

In testimony whereof, I hereunto affix my signature in the presence of two witnesses.

ALBERT B. BEITMAN.

Witnesses:
 BRENNAN B. WEST,
 ROBERT L. BRUCK.